United States Patent
Ergin

(10) Patent No.: US 11,304,286 B2
(45) Date of Patent: Apr. 12, 2022

(54) POLARIZER

(71) Applicant: TRUMPF Lasersystems for Semiconductor Manufacturing GmbH, Ditzingen (DE)

(72) Inventor: Tolga Ergin, Bietigheim-Bissingen (DE)

(73) Assignee: TRUMPF Lasersystems for Semiconductor Manufacturing GmbH, Ditzingen (DE)

(*) Notice: Subject to any disclaimer, the term of this patent is extended or adjusted under 35 U.S.C. 154(b) by 190 days.

(21) Appl. No.: 16/739,218

(22) Filed: Jan. 10, 2020

(65) Prior Publication Data

US 2020/0154554 A1  May 14, 2020

Related U.S. Application Data

(63) Continuation of application No. PCT/EP2017/067480, filed on Jul. 12, 2017.

(51) Int. Cl.
  *H05G 2/00* (2006.01)
  *B23K 26/064* (2014.01)
  *G02B 5/30* (2006.01)

(52) U.S. Cl.
  CPC ........... *H05G 2/008* (2013.01); *B23K 26/064* (2015.10); *G02B 5/3066* (2013.01)

(58) Field of Classification Search
  CPC ...... H05G 2/008; B23K 26/064; B23K 26/21; B23K 26/38; G02B 5/3066; G02B 5/3075; G02B 27/28; H01S 3/005
  USPC .......................................... 250/493.1, 504 R
  See application file for complete search history.

(56) References Cited

U.S. PATENT DOCUMENTS

| | | |
|---|---|---|
| 8,847,182 B2 | 9/2014 | Lambert |
| 9,559,483 B2 | 1/2017 | Fermann et al. |
| 9,977,348 B2 | 5/2018 | Bakiboglu et al. |
| 10,186,827 B2 | 1/2019 | Schulz et al. |

(Continued)

FOREIGN PATENT DOCUMENTS

| | | |
|---|---|---|
| CN | 1959463 | 5/2007 |
| CN | 101939880 | 1/2011 |

(Continued)

OTHER PUBLICATIONS

Murarka, et al ("Extinction ratio of germanium wedge-plate infrared polarizers," Applied Optics, vol. 20, Issue 19, pp. 3275-3276 (1981)). (Year: 1981).*

(Continued)

*Primary Examiner* — Michael Maskell
(74) *Attorney, Agent, or Firm* — Fish & Richardson P.C.

(57) ABSTRACT

A polarizer arrangement for polarizing a laser beam includes: multiple plate-shaped optical elements which are arranged in a beam path of the laser beam and each of which includes a beam entry surface for the laser beam and a beam exit surface for the laser beam, in which the beam entry surface of a respective plate-shaped optical element is oriented at the Brewster angle relative to the laser beam. The beam entry surfaces and the beam exit surfaces of the plate-shaped optical elements are in each case oriented at least at one wedge angle relative to one another. An EUV radiation generating device may include such a polarizer arrangement.

15 Claims, 3 Drawing Sheets

(56) References Cited

U.S. PATENT DOCUMENTS

| | | | | |
|---|---|---|---|---|
| 2003/0086451 A1* | 5/2003 | Hastings | ............... | G02B 5/3066 |
| | | | | 372/29.014 |
| 2011/0140008 A1 | 6/2011 | Bergstedt et al. | | |
| 2012/0280148 A1 | 11/2012 | Loopstra et al. | | |
| 2015/0351210 A1* | 12/2015 | Yanagida | ............... | H05G 2/008 |
| | | | | 250/504 R |
| 2017/0085054 A1* | 3/2017 | Schulz | ................. | H01S 3/2366 |

FOREIGN PATENT DOCUMENTS

| | | |
|---|---|---|
| CN | 102714911 | 10/2012 |
| CN | 104756607 | 7/2015 |
| CN | 106575087 | 4/2017 |
| DE | 102014105064 | 5/2015 |
| KR | 2017-0031709 | 3/2017 |
| WO | WO 2019/011419 | 1/2019 |

OTHER PUBLICATIONS

Bird et al: "Pile-of-Plates Polarizers for the Infrared: Improvement in Analysis and Design," Journal of the Optical Society of America, Mar. 1959, 49(3):235-237.

Murarka et al: "Extinction ratio of germanium wedge-plate infrared polarizers" Applied Optics, Oct. 1981, 20(19):3275-3276.

PCT International Preliminary Report on Patentability in International Appln. No. PCT/EP2017/067480, dated Feb. 20, 2018, 18 pages (with English translation).

PCT International Search Report and Written Opinion in International Appln. No. PCT/EP2017/067480, dated Feb. 20, 2018, 25 pages (with English translation).

CN Office Action in Chinese Appln No. 201780093027.1, dated Apr. 25, 2021, 21 pages (with English translation).

KR Office Action in Korean Appln. No. 10-2020-7004031, dated Sep. 1, 2020, 16 pages (with English translation).

* cited by examiner

POLARIZER

CROSS REFERENCE TO RELATED APPLICATIONS

This application is a continuation of and claims priority under 35 U.S.C. § 120 from PCT Application No. PCT/EP2017/067480 filed on Jul. 12, 2017, the entire contents of which is incorporated herein by reference.

TECHNICAL FIELD

The present disclosure relates to a polarizer arrangement for polarizing a laser beam, in which the polarizer arrangement includes: multiple plate-shaped optical elements arranged in a beam path of the laser beam, each plate-shaped optical element comprising a beam entry surface for the laser beam and a beam exit surface for the laser beam, wherein the beam entry surface of a respective plate-shaped optical element (in the respective plane of incidence) is oriented at the Brewster angle relative to the laser beam. The present disclosure further relates to an extreme ultra-violet (EUV) radiation generating device with such a polarizer arrangement.

BACKGROUND

A plate-shaped transmitting optical element may be used for polarizing light, for example in the form of a (e.g. non-polarized) laser beam, if the laser beam is incident at the so-called Brewster angle on a beam entry surface of the optical element. A radiation part reflected at the beam entry surface is in this case polarized almost exclusively perpendicularly (s-polarization) relative to the plane of incidence of the laser beam, i.e., the reflectivity for a second (p-polarized) radiation part perpendicular thereto is practically zero. A radiation part transmitted from the beam entry surface therefore typically includes a high p-polarized radiation part which passes parallel to the plane of incidence of the incident laser beam.

Polarizers driven in transmission can also be used for high-power applications, in which the laser beam has a power of several hundred watts, as is the case for example with laser processing machines for processing, such as for cutting or welding, workpieces or with EUV radiation generating devices, in which a high-power laser beam is directed at a target material, in order to transform the target material into a plasma state to generate EUV radiation.

A polarization-selective coating may be formed at the beam entry surface of a polarizer driven in transmission, in order to increase the reflectivity of the polarizer surface for the s-polarized radiation part of the laser beam or in order to intensify the separation of the radiation parts which are polarized perpendicularly relative to each other. Polarizers of this kind are also called thin-film polarizers (TFP). The problem with thin-film polarizers with high laser powers is that due to the absorption of the laser radiation a temperature-dependent change of the refractive index develops in the polarization-selective coating, which results in a so-called thermal lens. Thin-film polarizers can therefore, as a rule, only be used in high-power applications provided that additional measures are taken in order to compensate for the thermal lens.

Alternatively or additionally to a polarization-selective coating, a polarizer arrangement may include not just one but several transmitting optical elements in the form of plane-parallel plates, which are oriented in parallel to each other and with their beam entry surfaces at the Brewster angle relative to the incident laser beam, in order to further reduce the comparatively small s-polarized radiation part, which is transmitted by a respective plane-parallel plate, so that the laser beam exiting from the polarizer arrangement is almost exclusively p-polarized.

In particular, in the case that the plane-parallel plates are arranged at a comparatively small distance from each other, there occurs however the problem of constructive and destructive interferences between partial beams, which are reflected at the beam entry surfaces/the beam exit surfaces of the plane-parallel plates. In order to prevent interferences, the distance between plates following one another in the beam path is therefore typically chosen to be large enough to prevent the reflected partial beams from overlapping. In this case however the polarizer arrangement requires considerable installation space which represents a considerable restriction if available installation space is insufficient.

SUMMARY

The present disclosure covers a polarizer arrangement, which is constructed in a compact manner, as well as an EUV radiation generating device that includes such a polarizer arrangement.

According to a first aspect, a polarizer arrangement includes plate-shaped optical elements in which beam entry surfaces and beam exit surfaces of the plate-shaped optical elements are each oriented with respect to one other at at least one wedge angle.

Due to deviating (in a targeted manner) from the parallel orientation of the beam entry surface (which can be in the form of a plane) from the beam exit surface (which can be in the form of a plane) of a respective plate-shaped optical element by providing a (e.g., small) wedge/wedge angle the above-described interference effects (hereunder also called Fabry-Perot effects) can be prevented to the greatest possible extent. In order to fulfill the Brewster condition, despite the wedge angle, the plate-shaped optical elements are oriented relative to each other (e.g., rotated relative to each other) in such a way that the laser beam continues to be incident on the beam entry surface at the Brewster angle. For the purposes of the present disclosure, being incident "at the Brewster angle" $\alpha_B$ is understood to mean that the laser beam is incident with a deviation from the Brewster angle $\alpha_B$ in a magnitude of approximately +/−0.5°, in other words it means that angles $\alpha_B$+/−0.5° also fall within the concept of "at the Brewster angle".

By providing a wedge angle, the occurrence of two or more parallel surfaces on the plate-shaped optical elements being arranged in the beam path of the laser beam one behind the other can be prevented. Or—insofar as that should still be the case—the occurrence of a constant optical path length between the two parallel surfaces between adjacent reflected partial beams, which could lead to interference effects, can be prevented. By arranging a number of plate-shaped optical elements with a respective wedge angle at a small distance from each other, a high extinction for the s-polarized radiation component can be achieved despite limited installation space, without any of the above-described Fabry-Perot effects occurring.

The beam entry surfaces and the beam exit surfaces of the plate-shaped optical elements can in principle be oriented arbitrarily (in a skewed manner) relative to each other in space as long as it is ensured that the beam entry surfaces are each oriented at the Brewster angle relative to the laser beam. At least one plate-shaped optical element of the polarizer arrangement may include not just one, but two wedge angles, which pass in two planes being typically perpendicular to each other. A skewed orientation of the plate-shaped optical elements and/or the use of plate-shaped optical elements with two wedge angles may be advantageous in order to minimize Fabry-Perot effects.

In some embodiments, the wedge angle or one wedge angle of at least one plate-shaped optical element lies in a plane of incidence of the laser beam onto the beam entry surface of the plate-shaped optical element. The wedge angles of all plate-shaped optical elements may in particular lie in a common plane, which typically corresponds to the plane of incidence of the laser beam onto the first plate-shaped optical element. In this case, the beam entry surfaces and the beam exit surfaces of the plate-shaped optical elements, between which the wedge tips are formed, pass along planes, which are typically oriented perpendicularly to the plane of incidence of the laser beam. The wedge tip of a respective plate-shaped optical element is defined as the intersection line between the beam entry surface and the beam exit surface of a respective plate-shaped optical element in the respective plane, in which the wedge angle lies. Due to the normally small wedge angle, the wedge tip of the plate-shaped optical elements is typically not contained in their volume, i.e., the beam entry surface and the beam exit surface do not meet one another within the volume of the plate-shaped optical elements.

In further embodiments, the wedge angle for at least one plate-shaped optical element lies in a plane extending perpendicularly to the plane of incidence of the laser beam on the beam entry surface. The plane of incidence is defined by the beam direction of the incident laser beam on the beam entry surface and the Normal direction of the beam entry surface. The laser beam is incident on the beam entry surface in the plane of incidence at the Brewster angle. The angle, at which the laser beam is oriented in a plane perpendicular to the plane of incidence relative to the beam entry surface, is close to 0°, i.e., in this plane the laser beam enters the beam entry surface essentially parallel to the Normal direction. Due to the distinctly smaller angle of incidence in the plane perpendicular to the plane of incidence, the probability for an occurrence of undesirable total reflection at the beam entry surface/beam exit surface of the plate-shaped optical element is smaller than in the plane of incidence. Therefore, it may be advantageous if the plate-shaped optical element includes the wedge angle or one wedge angle in the plane perpendicular to the plane of incidence of the laser beam.

In some embodiments, a first wedge angle for at least one plate-shaped optical element lies in a plane of incidence of the laser beam on the beam entry surface and a second wedge angle lies in a plane extending perpendicularly to the plane of incidence of the laser beam on the beam entry surface. It is favorable to use at least one plate-shaped optical element in the polarizer arrangement, which includes two (e.g., possibly different) wedge angles in two planes perpendicular to each other, in order to further reduce Fabry-Perot effects. In particular, for a suitable arrangement of such a plate-shaped optical element, the beam entry surfaces and/or the beam exit surfaces of two different plate-shaped optical elements being oriented in parallel relative to each other can be prevented.

In some embodiments, the plate-shaped optical elements include the same wedge angle in a plane of incidence of the laser beam on the respective beam entry surface and/or the same wedge angle, respectively, in a plane extending perpendicularly to the plane of incidence of the laser beam. Since the wedge angle is typically comparatively small, differences between wedge angles cannot, as a rule, be detected with the naked eye, so that when building the polarizer arrangement it may be advantageous to label the optical elements. It is also advantageous for the alignment of the plate-shaped optical elements if all plate-shaped optical elements in a respective plane include the same wedge angle.

In further embodiments, the wedge angle is less than 1.00, preferably less than 0.5°. A comparatively small wedge/wedge angle is typically sufficient in order to suppress the Fabry-Perot effects described above. However, the wedge angle should still be large enough to permit a spatial separation and/or an angular separation of the main beam from the reflected partial beams. To this end an optical filter, e.g., a spatial filter, may possibly be used, which is arranged in the beam path of the exiting laser beam. No partial beam reflected at the respective beam entry surfaces/beam exit surfaces should overlap with the main beam that passes through the polarizer arrangement without reflection at the beam entry/beam exit surfaces, in order to effectively suppress the Fabry-Perot effects/Etalon effects.

With a wedge-shaped optical element the following formula applies for the wedge angle $\gamma$, the angle of incidence $\alpha$ (e.g., the Brewster angle $\alpha_B$) and the deflecting angle $\delta$, at which the laser beam, when exiting from a wedge-shaped plate-shaped optical element, deviates from the angle of incidence $\alpha$, more precisely from the beam direction of the incident laser beam:

$$\delta = \alpha - \gamma + \sin^{-1}[\sin(\gamma)\sqrt{n^2 - \sin^2\alpha} - \sin\alpha \cos\gamma], \quad (1)$$

where n denotes the refractive index of the transmitting material of the plate-shaped optical element. Formula (1) generally applies, i.e., both in the case that the angle of incidence $\alpha$, the wedge angle $\gamma$ and the deflecting angle $\delta$ lie in the plane of incidence, and in the case that these angles lie in a plane perpendicular to the plane of incidence. The beam entry surface of the second plate-shaped optical element following the first plate-shaped optical element in the beam path may for example be oriented rotated by the (negative) deflecting angle $-\delta$, in order to correct the angular deviation and thereby to ensure that the beam entry surface of the second plate-shaped optical element also fulfills the Brewster condition.

The Brewster angle $\alpha_B$ at the beam entry surface/generally at a boundary surface between an optically thinner and an optically denser medium may be expressed by the following formula:

$$\alpha_B = \arctan(n_2/n_1), \quad (2)$$

wherein $n_2$ denotes the real part of the refractive index of the optically denser medium and $n_1$ denotes the real part of the refractive index of the optically thinner medium (typically air or vacuum with $n_1=1.00$). The Brewster angle $\alpha_B$ for a polarizer arrangement arranged in ambient air is thus determined by the refractive index $n_2$ of the transmissive material, at which the beam entry surface is formed.

If the laser beam is a $CO_2$ laser beam with a wavelength of approximately 10.59 μm, the transmitting material may be for example zinc selenide (ZnSe), which at this wavelength includes a refractive index $n_2$ of 2.4027. According to the above formula (2) a Brewster angle of $\alpha_B=67.4032°$ results in this case. The type of transmitting material is adapted to the wavelength of the laser beam used. For smaller wavelengths in the near IR wavelength range/in the visible wavelength range quartz glass may for example be used as material for the plate-shaped optical element. In particular, with the polarizer arrangement described here providing a polarization-selective coating on the plate-shaped optical elements may be dispensed with. Therefore, it is possible to exclusively use transmitting materials in the polarizer arrangement, which exhibit little absorption and a reduced thermal lens even for high laser outputs.

In some embodiments, respectively two plate-shaped optical elements following one another in the beam path of the laser beam in a beam direction of the incident beam include a minimal distance of less than 5 mm, preferably of less than 2 mm, in particular of less than 1 mm from one another. As described above Fabry-Perot interference effects can be prevented/strongly reduced with the aid of the wedge angles, so that the plate-shaped optical elements can be arranged at a very small distance from each other, in which the plate-shaped optical elements can be arranged at such a small distance from each other that they (almost) touch.

In some further embodiments, the beam entry surfaces and beam exit surfaces for at least two plate-shaped optical elements following one another in the beam path of the laser beam are not oriented in parallel to one another. In particular, in some embodiments, none of the beam entry surfaces and beam exit surfaces for all plate-shaped optical elements arranged in the beam path of the laser beam may be oriented in parallel. Due to the non-parallel orientation of the respective beam entry surfaces and beam exit surfaces of the plate-shaped optical elements the above-described interference effects may be avoided. In case the wedge angles of the plate-shaped optical elements lie in a common plane, the non-parallel orientation means that the plate-shaped optical elements are rotated against each other in the common plane.

In some further embodiments, at least two plate-shaped optical elements following one another, in particular directly following one another in the beam path with their wedge angles lying in a common plane are oriented in the same direction (relative to the beam path of the laser beam). The respective wedge tips, at which the beam entry surface and beam exit surface of the plate-shaped optical elements meet with each other, lie in this case in the plane of incidence of the laser beam relative to the beam path of the laser beam on the same side. The laser beam is deflected at the plate-shaped optical elements oriented in the same direction in the plane of incidence in direction of the respectively broader end of the respective plate-shaped optical element, which faces away from the wedge tip. With several plate-shaped optical elements oriented in the same direction, the deflecting angles δ, at which the laser beam is rotated relative to the beam direction of the incident laser beam, are added up.

In some further embodiments, at least three plate-shaped optical elements, in particular directly following one another and oriented in the same direction, are rotated in the common plane about respectively the same angle of rotation, which preferably corresponds to the amount of a deflecting angle as the laser beam passes through a respective optical element, i.e., to the angle with which the laser beam is deflected as it passes through a respective plate-shaped optical element. The angle of rotation and the deflecting angle are oriented in opposite directions. In this way it is ensured that the laser beam impinges upon the beam entry surfaces of the respective plate-shaped optical elements at the Brewster angle.

In summary, with such arrangements, the laser beam is deflected at a number of N plate-shaped optical elements oriented in the same direction about a deflecting angle of N*δ relative to the beam direction of the incident laser beam, wherein the deflecting angle δ is obtained from the above formula (1). With the fan-shaped arrangement of the plate-shaped optical elements in the polarizer arrangement described herein, there are no parallel beam entry surfaces or beam exit surfaces in the common plane, so that the Fabry-Perot effects described herein can be avoided. The exiting laser beam may albeit, after passing through the plate-shaped optical elements, still include interference fringes, but the reflected partial beams are at an angle to the beam direction of the exiting laser beam, so that these can be spatially separated from the main beam. Separation may, for example, take place by a spatial filter, scraper or other device arranged in the beam path downstream of the plate-shaped optical elements.

In further embodiments, the respective wedge angles lying in a common plane are oriented in opposite directions for at least two plate-shaped optical elements following one another in the beam path of the laser beam, in which the two plate-shaped optical elements are rotated relative to each other about an angle of rotation which corresponds to the amount of the deflecting angle as the laser beam passes through a respective optical element. The respective edges, at which the beam entry surface and the beam exit surface of the plate-shaped optical elements meet with each other, lie in this case on opposite sides in the plane of incidence of the laser beam relative to the beam path of the laser beam. In other words, the two plate-shaped optical elements are arranged rotated against each other by approximately 180°. In this case as well, the laser beam, after passing through the first plate-shaped optical element, impinges upon the beam entry surface of the second plate-shaped optical element at the Brewster angle. In order to ensure this, the second plate-shaped optical element is rotated by the angle of rotation δ relative to the first plate-shaped optical element, which corresponds to the negative deflecting angle −δ. However the wedge angle between the beam entry surface and the beam exit surface of the second plate-shaped optical element is oriented in the opposite direction, so that the laser beam exits the second plate-shaped optical element at the beam exit surface parallel to the incident laser beam, albeit with a lateral offset to the incident laser beam. With the pair of plate-shaped optical elements again none of the beam entry surfaces and beam exit surfaces in the plane of the respective wedge angles are oriented parallel to each other.

In a further development at least two pairs of plate-shaped optical elements with oppositely oriented wedge angles are arranged one behind the other in the beam path, in which the beam entry surfaces and the beam exit surfaces of the two pairs of plate-shaped optical elements are each oriented parallel to each other. In other words two or more pairs of plate-shaped optical elements oriented in parallel in the respective plane are in this case arranged one behind the other in the beam path of the laser beam. The parallel orientation of the beam entry surface of the first plate-shaped optical element of the first pair and of the beam entry surface of the first plate-shaped optical element of the second pair does however not represent a true Fabry-Perot cavity, since the second plate-shaped optical element of the first pair is arranged between these two parallel surfaces, which includes the wedge angle, so that the optical path length for beams (e.g., the partial beams) offset in parallel in this cavity does not represent a constant. The number of parallel oriented pairs of plate-shaped optical elements with oppositely oriented wedge angle can be enlarged practically arbitrarily without the exiting laser beam being at an angle to the incident laser beam, for it is the lateral offset which increases in this case.

In such a parallel arrangement of the plate-shaped optical elements the (partial) beams reflected at two parallel surfaces albeit include, due to the wedge in the cavity, a different optical path length and thus a different phase, but the reflected (partial) beams exit at the same angle from the polarizer arrangement as the (main) beam. Depending on the thickness of the plate-shaped optical elements and the distance of the plate-shaped optical elements from each other the reflected (partial) beams are still in this case spatially separated from each other and can therefore be spatially separated from the (main) beam by a suitable filter means.

In some further embodiments, at least two pairs of plate-shaped optical elements with oppositely oriented wedge angle are arranged one behind the other in the beam path, and the beam entry surfaces and beam exit surfaces of the at least two pairs of plate-shaped optical elements are oriented mirror-symmetrically relative to a plane perpendicular to the incident laser beam. Due to the mirror-symmetrical orientation of the two or more (e.g., identical) pairs of plate-shaped optical elements the lateral offset generated by the first pair of plate-shaped optical elements can be compensated for by the lateral offset which is generated by the second pair of plate-shaped optical elements. For an identical number of mirror-symmetrically arranged pairs the laser beam can in this way pass through the polarizer arrangement without a lateral offset.

In some further embodiments, the polarizer arrangement includes a mounting for jointly fixing the plate-shaped optical elements. The (e.g., mechanical) mounting serves to receive the plate-shaped optical elements in a predefined orientation and position relative to one another. To this end the mounting may engage for example at the lateral rim of the plate-shaped optical elements in order to fix the same.

In some further embodiments, the polarizer arrangement includes an optical filter arranged in the beam path of the entering laser beam upstream of the multiple plate-shaped optical elements and/or an optical filter arranged in the beam path of the exiting laser beam downstream of the multiple plate-shaped optical elements for filtering radiation parts passing at an angle to the beam direction of the entering and/or the exiting laser beam. The optical filter may for example be a spatial filter, which includes a lens and a shutter with a small aperture diameter (pin hole). A conventional shutter or scraper may be used alternatively or additionally in order to remove the undesirable radiation parts. The radiation parts which pass at an angle to the exiting laser beam are typically partial beams/radiation parts of the incident laser beam, which were (e.g., repeatedly) reflected at the plate-shaped optical elements. The radiation parts, which pass at an angle to the incident laser beam, are typically radiation parts which were reflected back from the plate-shaped optical elements, as well as possibly radiation parts which were reflected back from a workpiece (see below).

The polarizer arrangement described herein can also be used, in particular, as an optical diode/optical insulator, which allows a p-polarized laser beam passing through the polarizer arrangement forwards, to essentially pass through unfiltered, but which suppresses as far as possible an s-polarized laser beam passing through the polarizer arrangement backwards. The s-polarized laser beam/the generally s-polarized laser radiation is at least partially reflected at a respective plate-shaped optical element, which is oriented at the Brewster angle, and can for example be caught in a beam dump. The beam dump may be integrated with the mounting/housing for the plate-shaped optical elements, but it may also be arranged outside the mounting.

The laser beam entering into the polarizer arrangement serving as an optical insulator may already be linearly polarized, in such a way that it is not attenuated/only slightly attenuated when passing through the polarizer arrangement. Typically, such a laser beam is p-polarized relative to the plane of incidence on the beam entry surface of the first plate-shaped optical element in the beam path. Passing of an already linearly polarized laser beam through the polarizer arrangement which maintains its linear polarization in the polarizer arrangement, may be useful, if this laser beam is reflected back from one or more objects (e.g., a target material) to the polarizer arrangement, which are arranged downstream of the polarizer arrangement (see below).

The present disclosure also relates to an EUV radiation generating device, including: a driver laser arrangement for generating a laser beam, a vacuum chamber, in which a target material can be arranged, a beam guidance device for guiding the laser beam from the driver laser device to the target material, as well as a polarizer arrangement as described further above, which serves to (e.g., linearly) polarize the laser beam and/or serves as an optical insulator. The beam guidance device guides the laser beam to a focusing element/a focusing arrangement which serves to focus the laser beam in a target area. In the target area a target material (e.g., tin) is provided, which when irradiated with the laser beam transitions into a plasma state and then emits EUV radiation.

In some embodiments, the EUV radiation generating device include a phase-shifting device, which is arranged between the polarizer arrangement and the target material, in which the phase-shifting device is configured for forming a laser beam reflected at the target material, the polarization direction of which is oriented perpendicularly to the polarization direction of the laser beam propagating in direction of the target material. The polarization direction of the laser beam is in this case rotated by 90° in total at the phase-shifting device, so that the polarization direction of the laser beam reflected back from the target material and once again incident on the polarizer arrangement is oriented perpendicularly to the polarization direction of the laser beam propagating to the target material.

The phase-shifting device may for example be a phase-shifting mirror, which in forward direction of the passing of the laser beam and in backward direction of the passing of the laser beam generates a path difference of $\lambda/4$, thereby resulting in a total path difference of $\lambda/2$ and thus in a 90° rotation of the polarization direction. Due to the rotation of the polarization direction the backwards reflected laser beam is deflected by the polarizer arrangement, more precisely reflected at the respective plate-shaped optical elements, so that this can no longer get back to the beam source and the polarizer arrangement therefore functions as an optical insulator. The EUV radiation generating device may in addition include a beam dump, which serves to catch radiation parts reflected back from the target material to the polarizer arrangement of the laser beam/deflected by the plate-shaped optical elements of the polarizer arrangement. The polarizer arrangement can in this case serve as an optical insulator which prevents the laser beam reflected back from the target material from entering into the driver laser device.

The driver laser arrangement of the EUV radiation generating device typically includes one or, as required, more beam sources for generating one or, as required, more (e.g., pulsed) laser beams/so-called seed pulses, which are amplified in one, typically in several optical amplifiers of an amplifier arrangement to produce high laser outputs of several kW, possibly of 10 kW or above. The polarizer arrangement or one polarizer arrangement may be arranged in the driver laser arrangement or in the beam guidance device in order to polarize, as required, the laser beam generated by the beam source and/or in order to filter/deflect the laser beam reflected back from the target material. The polarizer arrangement may in particular also be used in the beam path before the amplifier arrangement because the laser output used there is albeit quite high, but typically not high enough in order to damage the plate-shaped optical elements of the polarizer arrangement. It is understood that the polarizer arrangement described here can also be used in other applications, for example in material processing, e.g., in laser processing machines. Also, instead of a laser beam, another (polychromatic) light beam may be polarized in the polarizer arrangement provided the bandwidth thereof does not span an excessively large wavelength range.

Further advantages are evident from the description and the drawing. The above-mentioned features and the features mentioned further below may be used each on their own or in any desired combinations. The embodiments shown and described are not to be understood as an exhaustive list, but rather as examples serving as explanation of the invention.

BRIEF DESCRIPTION OF THE DRAWINGS

FIG. 3B shows a schematic view of the first two optical elements of FIG. 3A in a plane extending perpendicularly to the plane of incidence.

DETAILED DESCRIPTION

In the following description of the drawings identical reference symbols are used for identical/functionally identical components.

Figure 1:
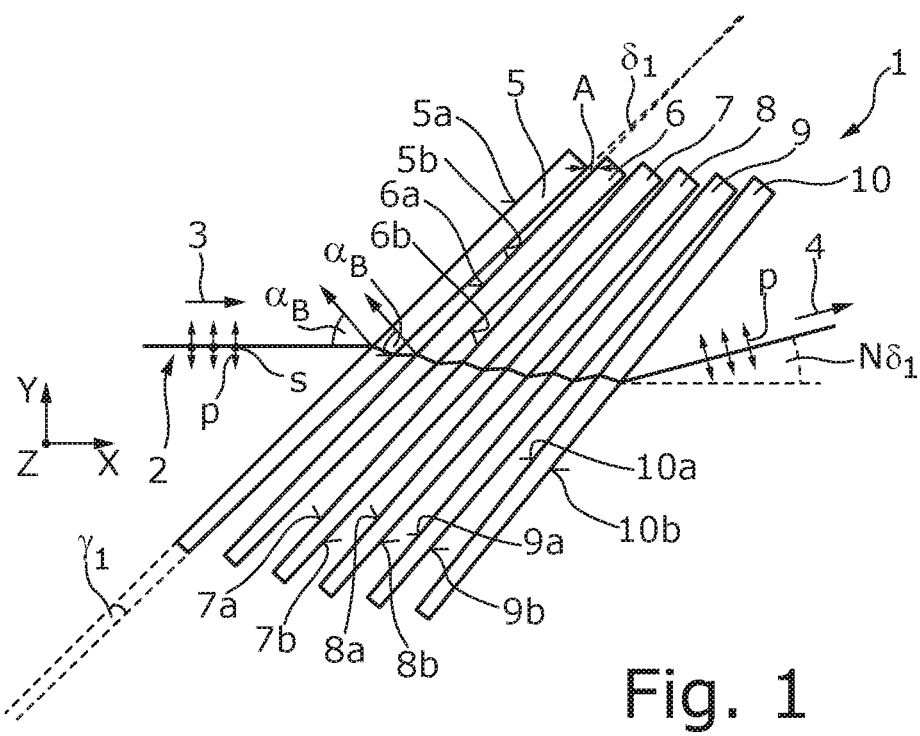
FIG. 1 shows a schematic view of an example of a polarizer arrangement with six plate-shaped optical elements arranged in a fan-shaped manner, each of which includes a respective wedge angle.

FIG. 1 shows a polarizer arrangement 1 for a laser beam 2, which includes six transmitting plate-shaped optical elements 5 to 10 in the form of plane-parallel plates. The laser beam 2 in the example shown is generated by a $CO_2$ laser source and includes a wavelength λ of approximately 10.59 μm. The material in the present example, from which the plate-shaped optical elements 5 to 10 are formed, is zinc selenide (ZnSe), which is transparent for the wavelength λ of the laser beam 2 and which exhibits a small absorption for this wavelength, so that a weak thermal lens forms in this material, even when using high beam intensities/high laser powers. It is understood that the laser beam 2 may also include a different wavelength λ, for example a wavelength λ of approximately 1 m or less. In this case the material of the plate-shaped optical elements 5 to 10 may be quartz glass or another material with preferably minimal absorption.

The plate-shaped optical elements 5, 6, 7, 8, 9, 10 each include a planar beam entry surface 5a, 6a, 7a, 8a, 9a, 10a, through which the (in the example shown) non-polarized laser beam 2 enters into the material of the plate-shaped optical elements 5, 6, 7, 8, 9, 10. The plate-shaped optical elements 5, 6, 7, 8, 9, 10. are rotated against each other in a plane of incidence X, Y of the laser beam 2 in relation to the laser beam 2, more precisely in relation to a beam direction 3 of the incident laser beam 2 passing in X-direction in such a way that the laser beam 2 impinges upon a respective beam entry surfaces 5a, 6a, 7a, 8a, 9a, 10a at the Brewster angle $\alpha_B$ to the respective surface normal.

Figure 4:
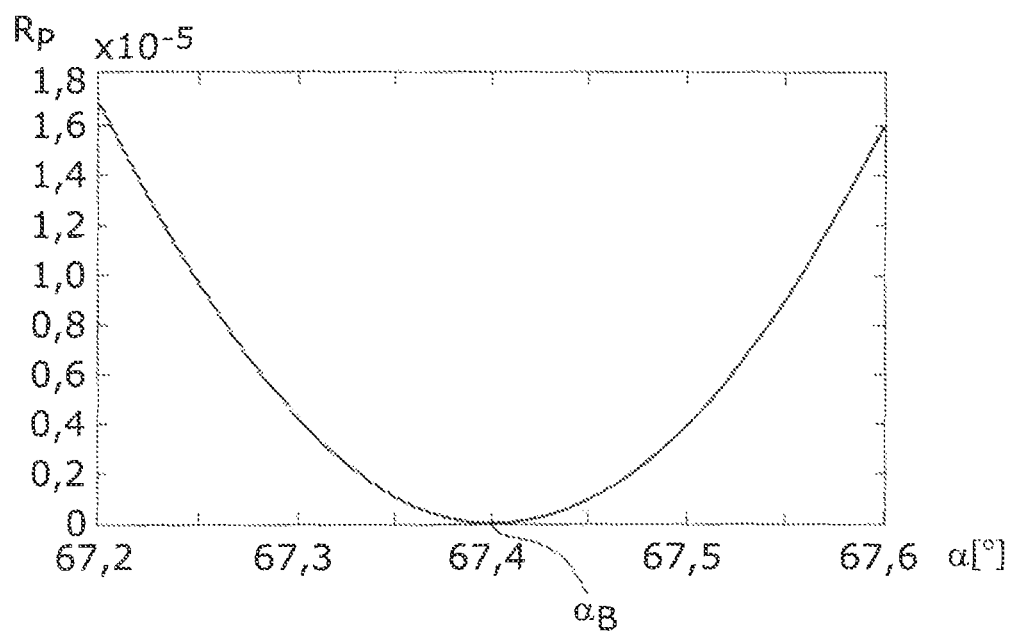
FIG. 4 shows a schematic view of an incident-angle-dependent reflectivity of a beam entry surface of a plate-shaped optical element for a p-polarized radiation part.

In the example shown, e.g., for a material with a refractive index $n_2$ of 2.4027 in air ($n_1$=1.0) the Brewster angle $\alpha_B$=arctan($n_2/n_1$) is approximately 67.4032°. With a Brewster angle $\alpha_B$ of approximately 67.4° the p-polarized part of the laser beam 2 at the respective beam entry surfaces 5a, 6a, 7a, 8a, 9a, 10a indicated by double arrows in FIG. 1 is practically not reflected, as can be clearly recognized in FIG. 4, which shows the reflectivity $R_P$ for the p-polarized radiation part at a respective (non-coated) beam entry surfaces 5a, 6a, 7a, 8a, 9a, 10a in dependence of the angle of incidence α. As will also be recognized in FIG. 4, the reflectivity $R_P$ for the p-polarized radiation part of the laser beam 2, even for small deviations from the Brewster angle $\alpha_B$ of e.g. approximately 0.2°, is still comparatively small and is less than $2.0 \times 10^5$. Ideally, the laser beam 2 should impinge upon the beam entry surface 5a exactly at the Brewster angle $\alpha_B$, in order to fully transmit the p-polarized radiation part. As has been described further above in terms of this application, being incident at the Brewster angle $\alpha_B$ is understood to include a deviation from the Brewster angle $\alpha_B$ in a magnitude of approximately +/−0.5°. Due to small deviations from the Brewster angle $\alpha_B$ the degrees of freedom for the plate-shaped optical elements in space are increased, which is particularly favorable if the plate-shaped optical elements are to be arranged in space in a skewed manner.

In contrast to the p-polarized radiation part the s-polarized radiation part of the laser beam 2 (indicated by dots in FIG. 1) is partially reflected at the beam entry surface 5a, so that the s-polarized radiation part of the laser beam 2 is reduced compared to the p-polarized radiation part at the exit of the plate-shaped optical element 5. The reflected s-polarized radiation part (not shown in FIG. 4) may for example be of a magnitude of approximately 50%. The laser beam 2 on the exit side, which has passed through the six plate-shaped optical elements 5 to 10, therefore includes (essentially) the p-polarized radiation part and is thus linearly (e.g., p-) polarized.

With regard to the planar beam exit surface 5b in the plane of incidence XY of the laser beam 2 on the first plate-shaped optical element 6, the beam entry surface 5a of the first plate-shaped optical element 5, which is planar in the example shown, is arranged at a wedge angle $\gamma_1$, which is comparatively small and may lie for example within a range of less than 1.00, less than 0.5°, or other ranges. In the example shown the wedge angle $\gamma_1$=0.10, i.e., the wedge angle $\gamma_1$ is approximately 6 angular minutes. In the example shown the wedge angles $\gamma_1$ of all six plate-shaped optical elements 5 to 10 are the same, but this is not absolutely necessary. As can also be recognized in FIG. 1, the wedge angle $\gamma_1$ is so small that the wedge tip, at which the beam entry surface 5a and the beam exit surface 5b meet with each other, is outside a respective plate-shaped optical element 5 to 10.

Due to the wedge angle γ the beam entry surfaces 5a, 6a, 7a, 8a, 9a, 10a are not oriented parallel to respective beam exit surfaces 5b, 6b, 7b, 8b, 9b, 10b. The laser beam 2 does therefore not exit from the first plate-shaped optical element 5 parallel to the beam direction 3 of the incident laser beam 2. Rather, the laser beam 2 exits at the beam exit surface 5b of the plate-shaped optical element 5 at a deflecting angle $\delta_1$ in the plane of incidence XY to the beam direction 3 of the incident laser beam. The relationship between the wedge angle $\gamma_1$, and the deflecting angle $\delta_1$ is expressed by the formula (1) indicated further above, which in the example shown results in: $\delta_1=0.484°$. The deflection of the laser beam 2 at the deflecting angle $\delta_1$ takes place starting from the beam direction 3 of the incident laser beam (corresponding to the X-direction of a XYZ coordinate system) in direction of the thicker end of the respective plate-shaped optical elements 5, 6, 7, 8, 9, 10.

To ensure that the second plate-shaped optical element 6 is also oriented with its beam entry surface 6a at the Brewster angle $\alpha_B$ relative to the laser beam 2 which exits from the first plate-shaped optical element 5, the deflection about the deflecting angle $\delta_1$ is compensated. To this end, the second plate-shaped optical element 6 is rotated in the plane of incidence X, Y of the laser beam 2 about an angle of rotation $\delta_1$ (more precisely $-\delta_1=-0.484°$) relative to the first plate-shaped optical element 5, so that the thicker ends of the two plate-shaped optical elements 5, 6 include a smaller (e.g., minimal) distance A (measured in beam direction 3 of the incident laser beam 2) from each other than their thinner ends. The third to sixth plate-shaped optical elements 7 to 10 are rotated correspondingly, i.e., about the same angle of rotation $\delta_1$, thereby resulting in total in the fan-shaped arrangement of the plate-shaped optical elements 5 to 10 shown in FIG. 1.

With the fan-shaped arrangement of the plate-shaped optical elements 5 to 10 shown in FIG. 1 the respective deflecting angles $\delta_1$ are summed up. The deflecting angle, at which the exiting laser beam 2 passes downstream of the plate-shaped optical elements 5 to 10, is therefore expressed as $N\times\delta_1$, wherein N is the number of plate-shaped optical elements 5 to 10. In the example shown the angle between the beam direction 3 of the entering laser beam 2 and the beam direction 4 of the exiting laser beam 2 is $6\times\delta_1=2.904°$ in total.

In the example shown in FIG. 1 the planar beam entry surfaces 5a, 6a, 7a, 8a, 9a, 10a and the planar beam exit surfaces 5b, 6b, 7b, 8b, 9b, 10b of the plate-shaped optical elements 5, 6, 7, 8, 9, 10, each pass perpendicularly to the plane of incidence of the laser beam 2, which in the example shown is the XY plane. Correspondingly the wedge angles $\gamma_1$ of the respective plate-shaped optical elements 5 to 10 also lie in the plane of incidence of the laser beam 2. Due to the fan-shape arrangement of the plate-shaped optical elements 5, 6, 7, 8, 9, 10, the beam entry surfaces 5a, 6a, 7a, 8a, 9a, 10a and the beam exit surfaces 5b, 6b, 7b, 8b, 9b, 10b are oriented at an angle different from zero relative to each other. Due to the non-parallel orientation of the plate-shaped optical elements 5 to 10, Fabry-Perot effects can be avoided, so that the plate-shaped optical elements 5 to 10 can be arranged from each other at a small distance A of a few millimeters, e.g., of less than 5 mm. In the example shown in FIG. 1, the minimal distance is expressed as A=2 mm.

In the example shown in FIG. 1, the plate-shaped optical elements 5 to 10 are each oriented with their wedge angles $\gamma_1$ in the same direction, i.e., their wedge tip (not depicted) is in each case on the same side of the beam path of the laser beam 2 (in FIG. 1 at the bottom). Due to the same-direction orientation of the plate-shaped optical elements 5 to 10 an angular deviation described further above occurs between the beam direction 3 of the entering laser beam 2 and the beam direction 4 of the exiting laser beam 2.

Figure 2:
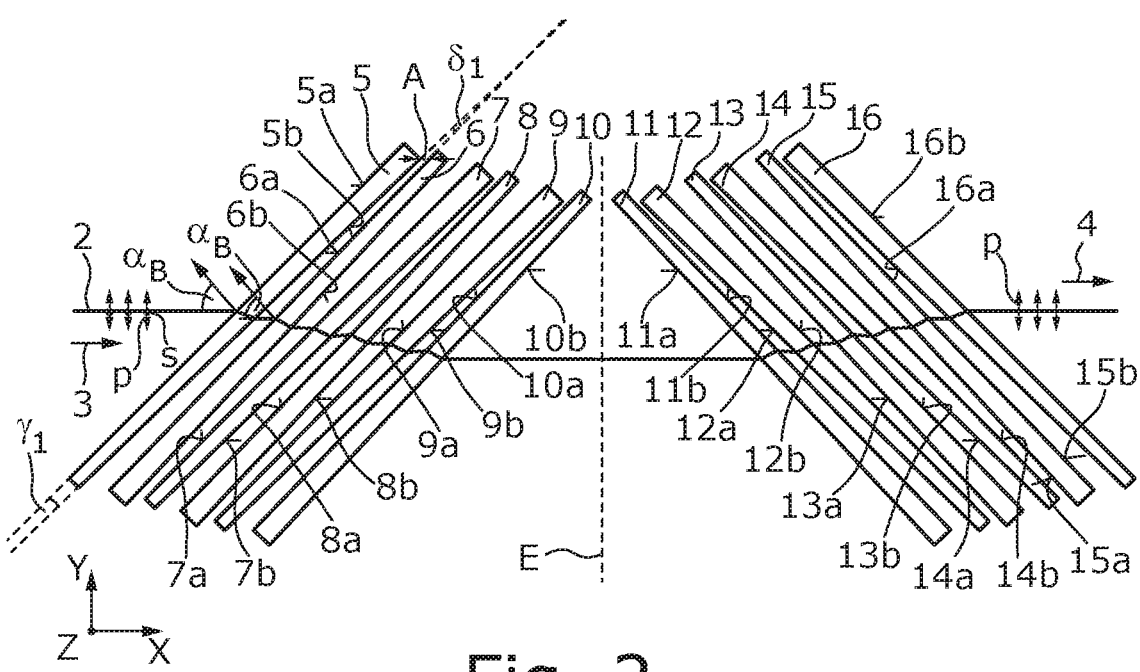
FIG. 2 shows a schematic view of a polarizer arrangement analogous to FIG. 1, which includes six pairs of plate-shaped optical elements.

FIG. 2 shows a polarizer arrangement 1, which is different from the polarizer arrangement 1 shown in FIG. 1 first of all in that this includes, instead of six plate-shaped optical elements 5 to 10, twelve plate-shaped optical elements 5 to 16, which are arranged and oriented mirror-symmetrically relative to a symmetry plane E which in the example shown passes perpendicularly to the beam direction 3 of the incident laser beam 2 (YZ plane). The seventh, eighth, ninth, tenth, eleventh, twelfth plate-shaped optical elements 11, 12, 13, 14, 15, 16 more precisely their beam entry surfaces 11a, 12a, 13a, 14a, 15a, 16a and their beam exit surfaces 11b, 12b, 13b, 14b, 15b, 16b are, with regard to the symmetry plane E, oriented mirror-symmetrically to the beam entry surfaces 5a, 6a, 7a, 8a, 9a, 10a/to the beam exit surfaces 5b, 6b, 7b, 8b, 9b, 10b of the first, second, third, fourth, fifth, sixth plate-shaped optical elements 5, 6, 7, 8, 9, 10.

As described in detail further below, the first to sixth plate-shaped optical elements 5 to 10 generate a lateral offset of the laser beam 2 in the plane of incidence (XY-plane), which is compensated for by the seventh to twelfth plate-shaped optical elements 11 to 16, so that the exiting laser beam 2 passes parallel and collinear to the incident laser beam 2.

The first to twelfth plate-shaped optical elements 5 to 16 are designed structurally identically to the plate-shaped optical elements 5 to 10 described in conjunction with FIG. 1, i.e., these also include in each case a wedge angle $\gamma_1$ of approximately 0.1° which lie in the plane of incidence XY. The polarizer arrangement 1 of FIG. 2 is different from the polarizer arrangement 1 shown in FIG. 1 with regard to the orientation/the arrangement of the second, fourth and sixth plate-shaped optical elements 6, 8, 10: the beam entry surface 6a of the second plate-shaped optical element 6 is, albeit, rotated as in FIG. 1 at an angle of rotation $\delta_1$ to the beam entry surface 5a of the first plate-shaped optical element 5 in order to fulfill the Brewster condition. In contrast to FIG. 1 the second plate-shaped optical element 6 however is, with regard to the wedge angle $\gamma_1$, oriented opposite to the first plate-shaped optical element 5, i.e., the wedge angles $\gamma_1$ and thus the corresponding wedge tips of the first and the second plate-shaped optical elements 5, 6 are arranged in the plane of incidence of the laser beam 2 on opposite sides of the beam path of the laser beam 2. At the second plate-shaped optical element 6 the laser beam 2 is therefore deflected about a deflecting angle $\delta_1$, the amount of which corresponds to the deflecting angle $\delta_1$ at the first plate-shaped optical element 5, which however is oppositely oriented, i.e., has an opposite sign with regard to the deflecting angle $\delta_1$ at the first plate-shaped optical element 5. After passing through the first and the second plate-shaped optical elements 5, 6 the laser beam 2 is therefore still oriented parallel to the beam direction 3 of the incident laser beam 2 and has a merely lateral offset.

The pair corresponding to the third and fourth plate-shaped optical elements 7, 8 is oriented parallel to the pair corresponding to the first and the second plate-shaped optical elements 5, 6, i.e., the beam entry surfaces 5a, 6a and the beam exit surfaces 5b, 6b of the first and second plate-shaped optical elements 5, 6 are oriented parallel to the beam entry surfaces 7a, 8a and the beam exit surfaces 7b, 8b of the third and fourth plate-shaped optical elements 7, 8. The same applies to the fifth and sixth plate-shaped optical elements 9, 10. The wedge-shaped second optical element 6, which is arranged between the two parallel beam entry surfaces 5a, 7a of the first and third plate-shaped optical elements 5, 7, prevents that the optical path length for (e.g., reflected) partial beams with parallel offset is constant. Despite the parallel orientation of the beam entry surface 5a of the first plate-shaped optical element 5 and the beam entry surface 7a of the third plate-shaped optical element 7, the Fabry-Perot effects occurring are insignificant. The same applies to all plate-shaped optical elements 5 to 16.

The polarizer arrangement 1 described in FIG. 1 and FIG. 2 may include a larger or smaller number of plate-shaped optical elements. Due to the wedge shape of the plate-shaped optical elements 5 to 16 these can be arranged at a small distance A from each other, without producing significant interference effects of the exiting laser beam 2, i.e., at a certain distance from the polarizer arrangement 1 the radiation parts passing at an angle to the beam direction 3 of the exiting laser beam 2 no longer overlap with the main beam. In this way an almost arbitrary number of plate-shaped optical elements can be accommodated within a small constructional space, so that the extinction coefficient for the s-polarized radiation part filtered by the polarizer arrangement 1 can be made almost as large as liked by an almost arbitrary number of plate-shaped optical elements.

The arrangements of plate-shaped optical elements 5 to 10/5 to 16 depicted in FIG. 1 and FIG. 2 can also be combined, e.g., the polarizer arrangement 1 of FIG. 1 may also include one or more pairs of plate-shaped optical elements which with regard to their wedge angle $\gamma_1$ are oppositely oriented. Correspondingly, a number of plate-shaped optical elements following one another in the beam path of the laser beam 2 may be arranged in the polarizer arrangement 1 of FIG. 2, the wedge angle $\gamma_1$ of which is oriented in the same direction.

Figure 3A:
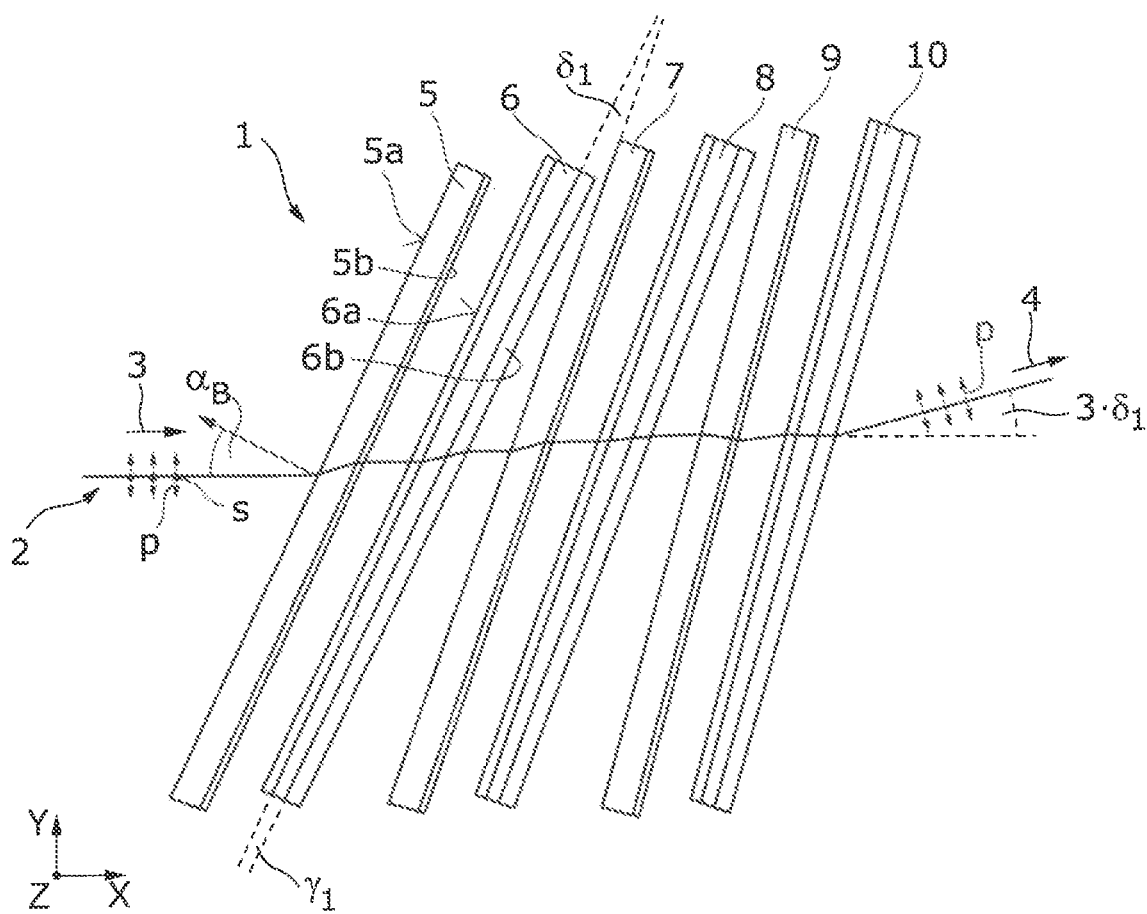
FIGS. 3A and 3B shows a schematic view of a polarizer arrangement analogous to FIG. 1 in a plane of incidence of the laser beam on the first plate-shaped optical element.
Figure 3B:
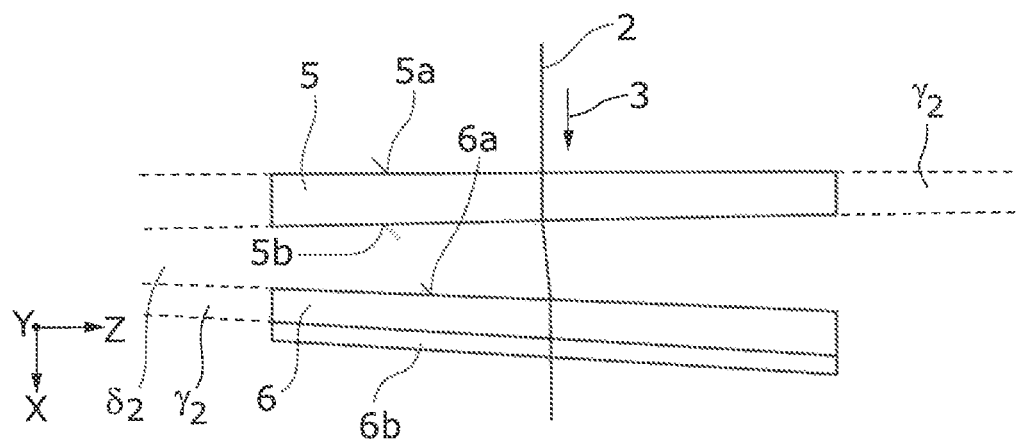

FIGS. 3A and 3B show a polarizer arrangement 1, which is different from the polarizer arrangement 1 shown in FIG. 2 in that essentially the plate-shaped optical elements 5 to 10, which are arranged in pairs: pair 5, 6, pair 7, 8, and pair 9, 10 as in FIG. 2, are oppositely oriented as regards a (second) wedge angle $\gamma_2$ (here: $\gamma_2=0.2°$), wherein the second wedge angle $\gamma_2$ lies in a plane XZ (see FIG. 3B) perpendicular to the plane of incidence XY. As can be recognized in FIG. 3B, the first and the second plate-shaped optical elements 5, 6 are oriented in the XZ plane perpendicularly to the plane of incidence XY at a (second) angle of rotation $\delta_2$, which as in the embodiment shown in FIG. 2 corresponds to the amount of the deflecting angle $\delta_2$, as the laser beam 2 passes through the first/the second optical element 5, 6. The deflecting angle $\delta_2$, due to the comparatively small angle of incidence $\alpha$ of almost 0° in the XZ plane, results from the simplified formula (1) (with $\alpha=0°$) to $\delta_2=(n-1)\gamma_2$, e.g., $\delta_2=0.28054$ in the present example. The laser beam 2 therefore impinges perpendicularly upon the beam entry surface 6a of the second plate-shaped optical element 6 in the YZ plane and is again oriented by this parallel to the direction of incidence 3, i.e., the laser beam 2, after passing through the first and the second optical element 5, 6, passes parallel to the direction of incidence 3, but laterally offset from the plane of incidence XY.

In the polarizer arrangement 1 shown in FIGS. 3A and 3B the second optical element 6 additionally includes a (first) wedge angle $\gamma_1$ in the plane of incidence XY, whilst the first optical element 5 merely includes the (second) wedge angle $\gamma_2$, which lies in the XZ plane. The first wedge angle $\gamma_1$ (here: $\gamma_1=0.1°$) causes the laser beam 1 to be deflected by a deflecting angle $\delta_1$ of 0.484°. In order to ensure that the third plate-shaped optical element 7 is also oriented with its beam entry surface at the Brewster angle $\alpha_B$ to the exiting laser beam 2 from the second plate-shaped optical element 5, the deflection is compensated by the deflecting angle $\delta_1$. To this end the second pair of plate-shaped optical elements 7, 8 in the plane of incidence X, Y of the laser beam 2 is rotated by the angle of rotation $\delta_1$, (more precisely $-\delta_1/-0.484°$) in the plane of incidence XY relative to the beam exit surface 6b of the second plate-shaped optical element 6. The third pair of plate-shaped optical elements 9, 10 are rotated correspondingly, e.g., about the same angle of rotation $\delta_1$, thus resulting in the fan-shape arrangement of the plate-shaped optical elements 5 to 10 in the plane of incidence XY, as shown in FIG. 3A. In total, the angle between the beam direction 3 of the entering laser beam 2 and the beam direction 4 of the exiting laser beam 2 is $3 \times \delta_1 = 1.452°$ for the polarizer arrangement 1 shown in FIGS. 3A and 3B in the plane of incidence XY.

Due to the (first) wedge angle $\gamma_1$ in the plane of incidence XY it is prevented that the beam exit surface 5b of the first plate-shaped optical element 5 and the beam entry surface 6a of the second plate-shaped optical element 6 are oriented parallel to each other. The same is true of the two further pairs of plate-shaped optical elements pair 7,8 and pair 9,10. With the polarizer arrangement 1 shown in FIGS. 3A and 3B the beam entry surfaces 5a, 6a, 7a, 8a, 9a, 10a and the beam exit surfaces 5b, 6b, 7b, 8b, 9b, 10b of respectively two plate-shaped optical elements 5 to 10 following one another in the beam path are thus not oriented parallel to each other.

In difference to what is described in FIG. 1, FIG. 2 as well as in FIGS. 3A and 3B, instead of an unpolarized laser beam 2 a p-polarized laser beam 2 can be introduced into the polarizer arrangement 1, which exits from the same essentially without being attenuated. The polarizer arrangement 1 in this case can be used as an optical insulator (or an optical diode) in order to prevent a reflected-back laser beam 2a, the polarization direction of which is rotated by 90° relative to the incident laser beam (e.g., a s-polarized laser beam 2a) from passing through the polarizer arrangement 1. An application of the polarizer arrangement 1 as an optical insulator in the context of an EUV radiation generating device 20 schematically shown in FIG. 5 will now be described.

The EUV radiation generating device 20 includes a beam source 21, an amplifier arrangement 22 with, e.g., three optical amplifiers/amplifier stages 23a, 23b, 23c, a beam guidance device 24 not shown in detail as well as a focusing device 25. The focusing device 25 serves to focus the laser beam 2 generated by the beam source 21 and amplified by the amplifier arrangement 22 onto a target area in a vacuum chamber 28, into which a target material 26 has been placed. During treatment with the laser beam 2 the target material 26 transitions into a plasma state, emitting EUV radiation in the process, which is focused by means of a collector mirror 27. In the example shown in FIG. 5 the collector mirror 27 includes an opening through which the laser beam 2 can pass. The beam source 21 in the example shown includes two $CO_2$ lasers in order to generate a pre-pulse and a main pulse, which are both amplified in the amplifier arrangement 22 and focused onto the target material 26. The beam source 21 together with the amplifier arrangement 22 forms a driver laser arrangement 29 of the EUV radiation generating device 20.

Figure 5:
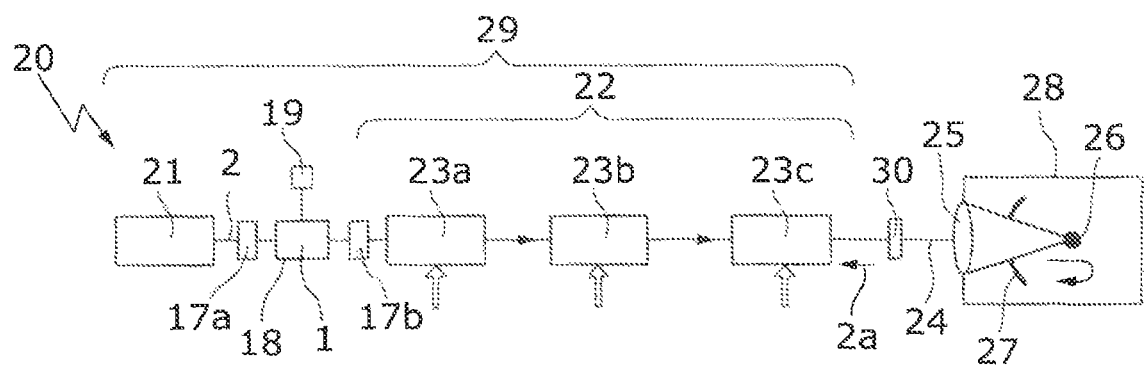
FIG. 5 shows a schematic view of an EUV radiation generating device with a polarizer arrangement as per FIG. 1 or FIG. 2, which is used as an optical insulator.

In the example shown in FIG. 5 the polarizer arrangement 1 is arranged between the beam source 21 and the amplifier arrangement 22 and serves to transmit the pulsed laser beam 2 generated by the beam source 21, which typically is already linearly polarized, as far as possible without losses from the driver laser arrangement 29 to the target material 26 and to filter/deflect the laser beam 2a reflected back from the target material 26 and propagating in the opposite direction, so that the same is no longer able to get back to the beam source 21/the optical elements in the beam path upstream of the polarizer arrangement 1.

To filter/deflect the laser beam 2a reflected back from the target material 26 and again incident on the polarizer arrangement 1, the polarization direction of the same is rotated by 90° relative to the exiting laser beam 2 in forward direction from the polarizer arrangement 1. A phase-shifting device 30 is arranged between the polarizer arrangement 1 and the target material 26 to rotate the polarization direction of the laser beam 2 by 90°. The phase-shifting device 30 may be, for example, a phase-shifting mirror, which generates a path difference of λ/2 in total, as the laser beam 2 propagates in direction of the target material 26 on its passage and the laser beam 2a is reflected back propagating in the opposite direction, thus causing the desired rotation of the polarization direction by 90°. It is understood that other phase-shifting or polarization-rotating optical elements can also be used, which are arranged between the polarizer arrangement 1 and the target material 26.

Filtering of the s-polarized reflected-back laser beam 2a in the polarizer arrangement 1 is effected by means of reflection at the respective beam exit surfaces 5b, 6b, 7b, 8b, 9b, 10b for the incident laser beam 2, which form beam entry surfaces for the reflected-back laser beam 2a. The s-polarized radiation part reflected at the respective beam exit surface 5b, 6b, 7b, 8b, 9b, 10b may be deflected in direction of a beam dump 19. The beam dump 19, as shown in FIG. 5, may be arranged outside a mounting 18, in which the plate-shaped optical elements 5 to 16 are received and fixed in their relative position to one another. Alternatively the beam dump 19 may, as required, be integrated in the mounting 18/in a corresponding housing of the polarizer arrangement 1, as long as sufficient cooling is provided.

FIG. 5 also shows an optical filter 17a, which is provided for filtering radiation parts (not shown in FIG. 5), which pass at an angle to the beam direction 3 of the entering laser beam 2. Radiation parts of this kind, which are generated by partial beams reflected at the plate-shaped optical elements 5 to 10/5 to 16, can be separated spatially, due to their orientation at an angle to the beam direction 3 of the entering laser beam 2, from the entering laser beam 2, which forms the main beam. The EUV radiation generating device 20 shown in FIG. 5 also includes a further optical filter 17b which serves to filter radiation parts which pass at an angle to the beam direction 4 of the exiting laser beam 2. Since the radiation parts oriented at the angle are arranged radially outside in the radiation profile of the laser beam 2, these can also be cut off by an optical filter 17a, b in the form of a conventional shutter.

The polarizer arrangement 1 or, as required, a further polarizer arrangement can also be arranged at another place in the EUV radiation generating device 20, for example in the beam guidance device 24, to generate a linearly polarized laser beam 2/form an optical insulator.

The polarizer arrangement 1 described further above has the advantage, in addition to its compact construction, that temperature effects, in particular temperature fluctuations, do not affect the performance of the polarizer arrangement 1, since their design principle is based on the geometric separation of beams. For this reason small changes in the refractive index/the thickness of the plate-shaped optical elements 5 to 16, as they may occur for high radiation powers, do not lead to adverse effects in the performance of the polarizer arrangement 1. Since beam pointing is compensated for, even chromatic deviations for the use of laser beams 2 with slightly different wavelengths as they are customary for the pre-pulse and the main pulse, have a slight effect (for example with a beam offset in the micrometer range).

What is claimed is:

1. A polarizer arrangement for polarizing a laser beam, the polarizer arrangement comprising:
    a plurality of plate-shaped optical elements arranged in a beam path of the laser beam, wherein each plate-shaped optical element of the plurality of plate-shaped optical elements comprises a corresponding beam entry surface through which the laser beam enters and a corresponding beam exit surface through which the laser beam exits,
    wherein the beam entry surface of each plate-shaped optical element of the plurality of plate-shaped optical elements is oriented at the Brewster angle relative to the laser beam,
    wherein, for each plate-shaped optical element of the plurality of plate-shaped optical elements, the beam entry surface and the beam exit surface of the plate-shaped optical element are each oriented relative to each other at at least one wedge angle for the plate-shaped optical element, and
    wherein for at least one plate-shaped optical element of the plurality of plate-shaped optical elements, a first wedge angle between the beam entry surface and the beam exit surface of the at least one plate-shaped optical element lies in a plane of incidence of the laser beam on the beam entry surface of the at least one plate-shaped optical element, and a second wedge angle between the beam entry surface and the beam exit surface of the at least one plate-shaped optical element lies in a plane extending perpendicularly to the plane of incidence of the laser beam.

2. The polarizer arrangement of claim 1, wherein
    (i) each first wedge angle of each plate-shaped optical element of the plurality of plate-shaped optical elements is the same as each other first wedge angle, and each second wedge angle of each plate-shaped optical element of the plurality of plate-shaped optical elements is different from each other second wedge angle,
    (ii) each second wedge angle of each plate-shaped optical element of the plurality of plate-shaped optical elements is the same as each other second wedge angle, and each first wedge angle of each plate-shaped optical element of the plurality of plate-shaped optical elements is different from each other first wedge angle, or
    (iii) each first wedge angle of each plate-shaped optical element of the plurality of plate-shaped optical elements is the same as each other first wedge angle, and each second wedge angle of each plate-shaped optical element of the plurality of plate-shaped optical elements is the same as each other second wedge angle, and the first wedge angle is different from the second wedge angle.

3. The polarizer arrangement of claim 1, wherein the at least one wedge angle is less than 1.0°.

4. The polarizer arrangement of claim 1, wherein respectively two plate-shaped optical elements of the plurality of plate-shaped optical elements following one another in the beam path of the laser beam in a beam direction of the entering beam are arranged a distance of less than 5 mm from one another.

5. The polarizer arrangement of claim 1, wherein for at least two plate-shaped optical elements of the plurality of plate-shaped optical elements following one another in the beam path of the laser beam, the beam entry surfaces and the beam exit surfaces are not parallel to each other.

6. The polarizer arrangement of claim 1, wherein the respective wedge angles of at least two plate-shaped optical elements of the plurality of plate-shaped optical elements following one another in the beam path of the laser beam are oriented in the same direction and lie in a common plane.

7. The polarizer arrangement of claim 6, wherein at least three plate-shaped optical elements of the plurality of plate-shaped optical elements following one another in the beam path of the laser beam are rotated relative to each other about a same angle of rotation.

8. The polarizer arrangement of claim 1, wherein the wedge angles of at least two plate-shaped optical elements of the plurality of plate-shaped optical elements following one another in the beam path of the laser beam respectively lie in a common plane and are oriented in opposite directions.

9. The polarizer arrangement of claim 8, wherein at least two pairs of plate-shaped optical elements of the plurality of plate-shaped optical elements are arranged in the beam path of the laser beam one behind the other, wherein the plate-shaped optical elements of each pair have oppositely oriented wedge angles, and wherein the beam entry surfaces of the at least two pairs of plate-shaped optical elements are each oriented parallel to each other and, separately, the beam exit surfaces of the at least two pairs of plate-shaped optical elements are each oriented parallel to each other.

10. The polarizer arrangement of claim 8, wherein at least two pairs of plate-shaped optical elements with oppositely oriented wedge angles, of the plurality of plate-shaped optical elements, are arranged in the beam path, and wherein the beam entry surfaces and the beam exit surfaces of the at least two pairs of plate-shaped optical elements are oriented mirror-symmetrically relative to a plane perpendicular to the beam direction of the incident laser beam.

11. The polarizer arrangement of claim 1, further comprising: a mounting arranged to jointly fixing the plate-shaped optical elements.

12. The polarizer arrangement of claim 1, further comprising: a first optical filter arranged in the beam path of the entering laser beam upstream of the plurality of plate-shaped optical elements, a second optical filter arranged in the beam path of the exiting laser beam downstream of the plurality of plate-shaped optical elements, or a first optical filter arranged in the beam path of the entering laser beam upstream of the plurality of plate-shaped optical elements and a second optical filter arranged in the beam path of the exiting laser beam downstream of the plurality of plate-shaped optical elements.

13. An EUV radiation generating device comprising:
 a driver laser arrangement configured to generate a laser beam;
 a vacuum chamber in which a target material can be arranged;
 a beam guidance device configured to guide the laser beam from the driver laser arrangement to the target material; and
 the polarizer arrangement of claim 1.

14. The EUV radiation generating device of claim 13, further comprising:
 a phase-shifting device arranged between the polarizer arrangement and the target material, wherein the phase-shifting device is configured to reflect a laser beam to the target material.

15. A polarizer arrangement for polarizing a laser beam, the polarizer arrangement comprising:
 a plurality of plate-shaped optical elements arranged in a beam path of the laser beam, wherein each plate-shaped optical element of the plurality of plate-shaped optical elements comprises a corresponding beam entry surface through which the laser beam enters and a corresponding beam exit surface through which the laser beam exits,
 wherein the beam entry surface of each plate-shaped optical element of the plurality of plate-shaped optical elements is oriented at the Brewster angle relative to the laser beam,
 wherein, for each plate-shaped optical element of the plurality of plate-shaped optical elements, the beam entry surface and the beam exit surface of the plate-shaped optical element are each oriented relative to each other at at least one wedge angle for the plate-shaped optical element,
 wherein respectively two plate-shaped optical elements of the plurality of plate-shaped optical elements following one another in the beam path of the laser beam in a beam direction of an entering beam are arranged a distance of less than 5 mm from one another.

* * * * *